Nov. 27, 1951  F. M. BROWN  2,576,567
COTTON BOLL GUIDE FOR COTTON PICKING MACHINES
Filed July 11, 1949  2 SHEETS—SHEET 1
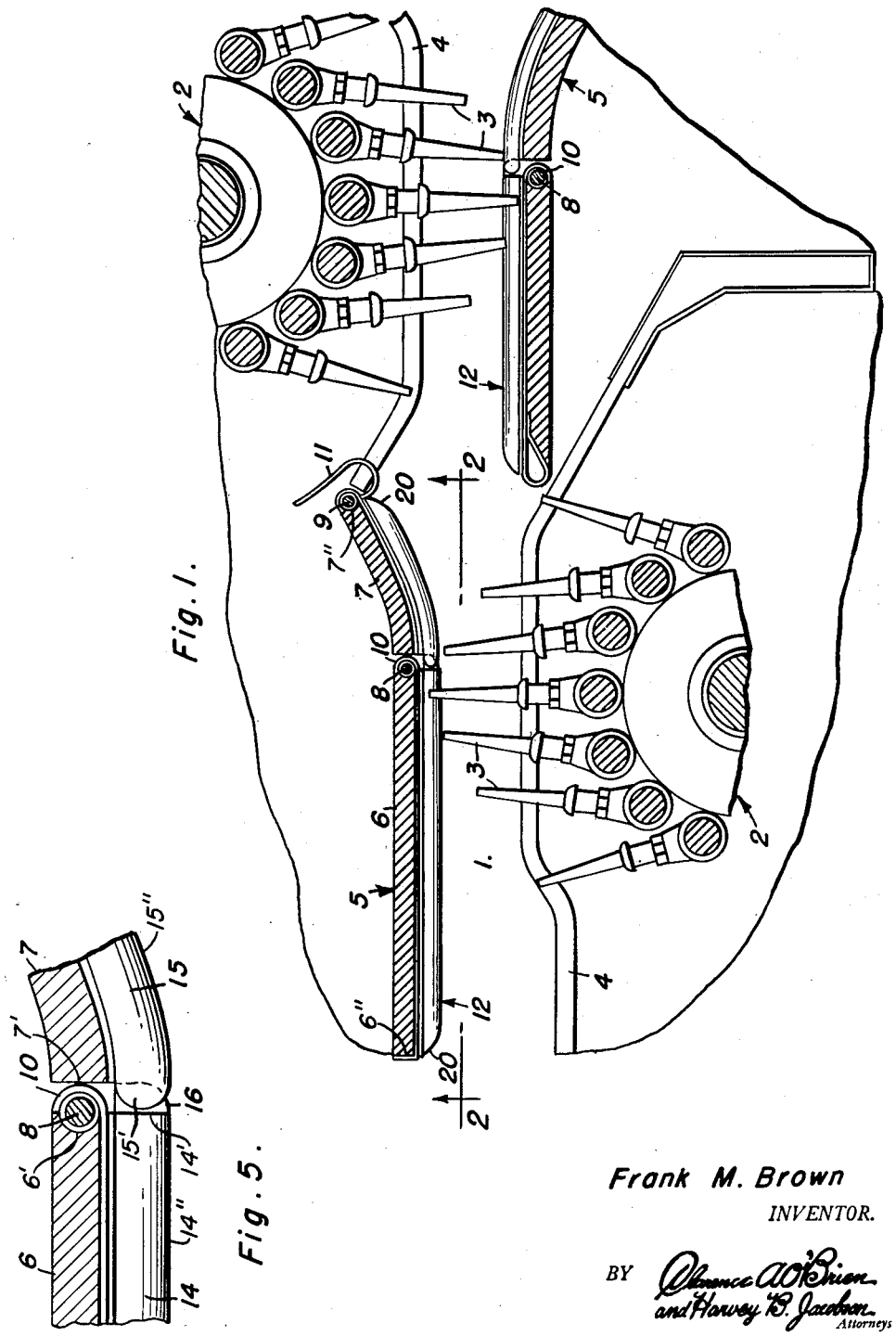
Frank M. Brown
INVENTOR.

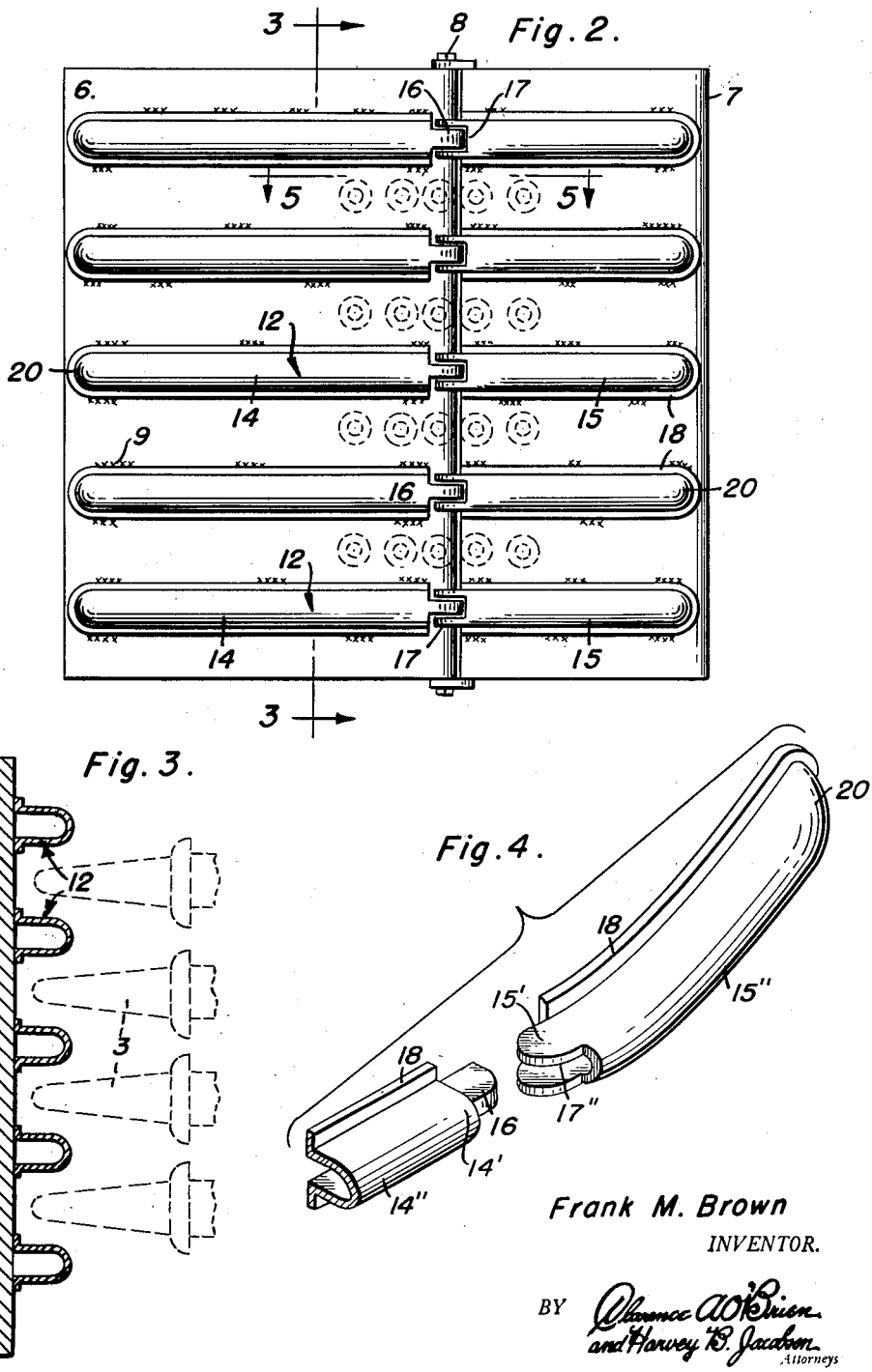

Patented Nov. 27, 1951

2,576,567

UNITED STATES PATENT OFFICE 2,576,567

COTTON BOLL GUIDE FOR COTTON-PICKING MACHINES

Frank M. Brown, Bakersfield, Calif., assignor to Arthur L. Atkinson, Bakersfield, Calif.

Application July 11, 1949, Serial No. 104,110

2 Claims. (Cl. 56—44)

My invention relates to improvements in cotton boll guides for the plant passage of conventional mobile cotton picking machines.

By way of premise, in the conventional mobile type of cotton picking machine, with which my invention is especially concerned, the cotton plants enter and pass through an elongated passage in the machine and the cotton is picked from the bolls of spindles revolving horizontally into and out of the passage and rotated as the same are revolved to wind the cotton from the bolls around the spindles. The walls of the passage are smooth and cotton bolls frequently break off the plants and fall to the ground, or slip out of the path of the spindles, and the cotton therein is not picked and is a total loss.

Having the foregoing in mind, it is primary object of my invention to guide the bolls as they pass through the passage so that the cotton will be picked from all of the bolls by the spindles and loss of unpicked cotton prevented.

Another object is to provide means for accomplishing the above objective which is simple in construction, inexpensive to manufacture and adapted for easy quick installation in the particular type of passage referred to, without necessitating alteration of the walls of the passage.

Other and subordinate objects, within the purview of my invention, together with the precise nature of my improvements will be readily understood when the succeeding description and claims are read with reference to the drawings accompanying and forming part of this specification.

In said drawings:

Figure 1 is a fragmentary view in horizontal section illustrating my improved guides applied in the passage of a cotton picking machine of the type specified in the foregoing;

Figure 2 is a fragmentary view in longitudinal section taken on the line 2—2 of Figure 1, and drawn to a larger scale;

Figure 3 is a view in vertical transverse section taken on the line 3—3 of Figure 2;

Figure 4 is a fragmentary view in perspective partly in section, of the sections of one of the guides separated;

Figure 5 is a fragmentary view in horizontal section taken on the line 5—5 of Figure 2 and drawn to a larger scale.

Referring now to the drawings by numerals, 1 designates the usual passage of the conventional mobile cotton picking machine, shown fragmentarily, as sufficient for the present purposes, and 2 the usual revolving spindle assemblies at opposite sides of the passage 1 with vertically spaced series of spindles 3 and which are revolved into and out of the passage 1 and rotated for picking purposes between doffer bars 4, all in a manner and through means well understood in the art and not requiring detailed explanation.

The side walls 5 of the passage 1 opposite the doffer bars 4 are formed of vertical sections 6, 7 with contiguous end edges 6', 7' and remote end edges 6'', 7'', the section 6 being laterally swingable on a vertical pivot post 8 at its contiguous edge 6' and the section 7 being similarly swingable on a pivot post 9 at its remote edge 7''. The sections 6, 7 are spring-tensioned as at 10, 11 for yielding outward swinging to obviate jamming of the plants in the passage 1 and stalling of the spindle assemblies 2.

According to my invention, horizontal vertically spaced, parallel guides 12 are provided on the wall sections 6, 7 between which the series of spindles 3 revolve, and rotate as best illustrated in broken lines in Figures 2 and 3. The guides 12 comprise sections 14, 15 opposed to the wall sections 6, 7 with contiguous ends 14', 15', the contiguous end 14' of section 14 having a reduced extension 16 slidably fitting in a bifurcation 17 of contiguous end 15' of the other section 15 opposite the pivot 8 between contiguous wall sections 6, 7 and whereby the guide sections 14, 15 may have compensating lateral and endwise play, relatively, when the wall sections, 6, 7 swing while, at the same time, the guides 12 are maintained substantially continuous. The guide sections 14, 15 are of rearwardly opening channeled form, being substantially U-shaped in cross section, so that said guides prevent front transversely rounded sides 14'', 15'' in the passage 1 which present cotton bolls, not shown, from catching on said guides 12. External, side edge flanges 18 on the guide sections 14, 15 are provided for use in securing said sections to the wall sections 6, 7, for instance, as shown in Figure 2 at 9 by spot welding. The remote ends 20 of the guide sections 14, 15 are closed and rounded longitudinally, to prevent interference with plants passing through the passage 1.

In the operation of the cotton picking machine described, as the cotton plants, not shown, pass through the passage 1, the bolls are guided between the guides 12 and are prevented from falling, or otherwise escaping out of the path of the spindles 3 so that the cotton picking operation is rendered more complete than in the usual conventional machine. The wall sections 6, 7, in such machines act as pressure members squeezing the cotton plants and bolls in the passage 1. Because of this, the bolls tend to frictionally hug said sections 6, 7 between the guides 12, whereby a substantial number of bolls are broken open, thus facilitating action of the spindles 3 in picking cotton therefrom.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a cotton picking machine having a longitudinal vertical passage through which cotton plants pass, and vertically spaced series of picker spindles revolving into and out of said passage about a vertical axis to pick cotton from the bolls on the plants, said passage having upright wall sections with hinged together vertical edges for relative play of the sections, horizontal vertically spaced guides on said wall sections spaced apart intermediate the series of spindles for guiding cotton bolls horizontally therebetween through said passage, said guides including guide sections having contiguous ends slidably fitted together for relative lateral and end play opposite the hinges of said wall sections such play compensating for play of said wall sections.

2. In a cotton picking machine having a longitudinal vertical passage through which cotton plants pass during the cotton picking operation, said passage having upright wall sections with hinged together vertical edges for relative play of the sections, horizontal vertically spaced guides on said wall sections for guiding the cotton through said passage, said guides comprising guide sections having contiguous ends slidably fitted together for relative lateral and end play opposite the hinges of said wall sections, such play compensating for relative play of said wall sections, one of said ends being bifurcated and the other of said ends being reduced and disposed in said bifurcated end to provide for slidably fitting said ends together.

FRANK M. BROWN.

REFERENCES CITED

The following references are of record in the file of this patent:

UNITED STATES PATENTS

| Number | Name | Date |
|---|---|---|
| 1,731,826 | Morana | Oct. 15, 1929 |
| 1,755,507 | Janacek | Apr. 12, 1930 |
| 1,926,337 | Johnston | Sept. 12, 1933 |
| 2,140,631 | Johnston | Dec. 20, 1938 |